United States Patent
Hirozawa et al.

[15] 3,704,768
[45] Dec. 5, 1972

[54] SPEED CHANGER

[72] Inventors: Koichiro Hirozawa; Shigeo Takahashi, both of Kariya, Japan

[73] Assignee: Aisin Seiki Kabushiki Kaisha, Kariya, Japan

[22] Filed: Nov. 2, 1970

[21] Appl. No.: 85,940

[30] Foreign Application Priority Data

| Oct. 31, 1969 | Japan | 44/87450 |
| Oct. 31, 1969 | Japan | 44/87451 |
| Oct. 31, 1969 | Japan | 44/87452 |
| Oct. 31, 1969 | Japan | 44/87453 |

[52] U.S. Cl...................................192/3.57, 74/473
[51] Int. Cl.............................................F16d 67/00
[58] Field of Search.....................................192/3.57

[56] References Cited

UNITED STATES PATENTS

| 2,337,748 | 12/1943 | Gsching | 192/3.57 X |
| 2,753,726 | 7/1956 | Harris | 192/3.57 |
| 2,966,972 | 1/1961 | Wallinger | 192/3.57 X |
| 3,352,392 | 11/1967 | Black et al. | 192/3.57 X |
| 3,386,543 | 6/1968 | Osburn | 192/3.57 |
| 3,517,788 | 5/1970 | Miller | 192/3.57 |
| 3,548,981 | 12/1970 | Hill et al. | 192/3.57 X |
| 3,557,918 | 2/1969 | Akima et al. | 192/3.57 X |

*Primary Examiner*—Benjamin W. Wyche
*Assistant Examiner*—Randall Heald
*Attorney*—Sughrue, Rothwell, Mion, Zinn & Macpeak

[57] ABSTRACT

This invention relates generally to a speed change gearing for a powered and wheeled vehicle, especially an aotomotive vehicle. More specifically, it relates to an intermittent control of the speed change gearing for transmitting power in the case of selective engagement of the gears contained therein.

The improvement resides in the provision of such means adapted for interrupting the engagement of a clutch unit provided in the speed changer, by one and the same servo-pressure which is utilized for the actuation of the fork means to execute the on-off control of the clutch, so as to reduce otherwise invited time lag between the operation of fork servo and that of clutch servo to a possible minimum.

8 Claims, 9 Drawing Figures

INVENTORS
KOICHIRO HIROZAWA
SHIGEO TAKAHASHI

BY Sughrue, Rothwell, Mion, Zinn & Macpeak

ATTORNEYS

SPEED CHANGER

This invention relates generally to a speed change gearing for a powered and wheeled vehicle, especially an automotive vehicle. More specifically, it relates to an intermittent control of the speed change gearing for transmitting power in the case of selective engagement of the gears contained therein.

It is commonly known that in the case of the speed change gearing of the kind above referred to, the peripheral speed of the drive gear of the speed changer should be brought into synchronization with that of the output shaft connected therewith, by means of a synchronizing device or the like means when an engaging stage is selected. In this case, naturally, power transmitting connection of the speed changer with the prime mover or vehicle drive engine must necessarily be cut off.

In the conventional speed changer, a separate hydraulic circuit is actuated or controlled by valve means said circuit being independent of a hydraulic circuit adapted for actuation of a clutch-operating fork means and said valve means being controlled in its shifting movement by a fork shaft drivingly connected with said fork means depending upon the shifting stroke of said fork shaft.

Such conventional arrangement of control means for on-off control of the clutch contained in the speed changer is defective, indeed, it its highly complicated design and arrangement, as well as, in its unreliable operation.

The main object of the invention is to provide a highly improved speed changer for use with a powered and wheeled vehicle, capable of substantially obviating the aforementioned conventional drawbacks and capable of interrupting the clutch engagement by one and the same servo-pressure which is utilized for the actuation of said fork means, thus making otherwise invited time lay between the operation of fork servo and that of clutch servo practically nil and providing a highly improved and reliable operation of the speed changer.

This and further objects, features and advantages of the invention will become more apparent when read the following detailed description of the invention by reference to the accompanying drawings illustrative of several preferred embodiments of the invention.

Figure 1:
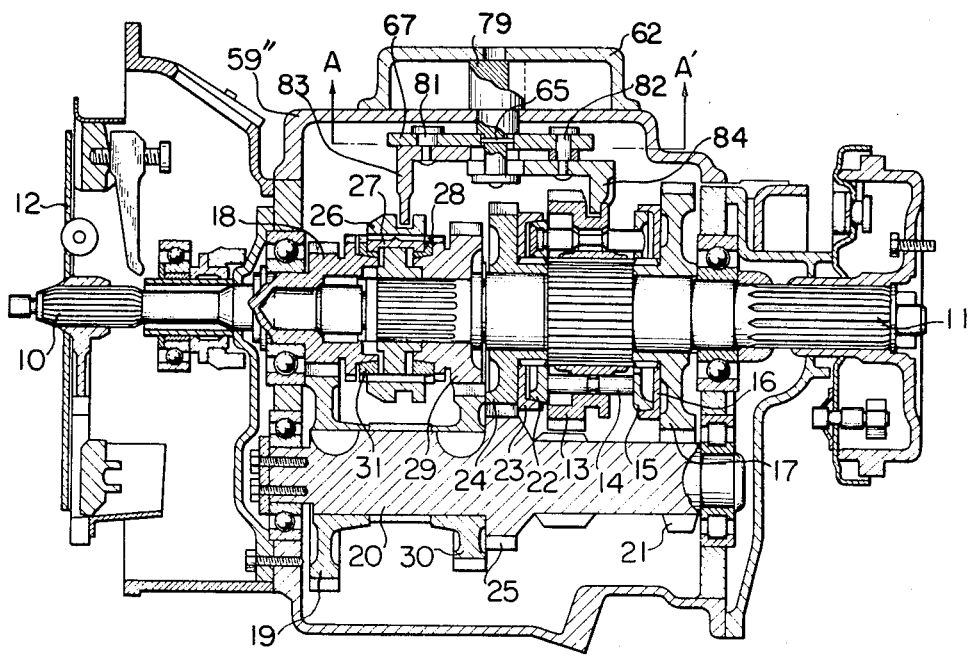
FIG. 1 is an axial section of a first embodiment of the speed changer according to this invention.

Referring now to FIG. 1, illustrative of a synchronous mesh type speed changer according to the first embodiment of the present invention, the numeral 10 denotes an input shaft; 11 an output shaft; and 12 a friction clutch unit for intermittent connection between an internal combustion engine and a transmission mechanism.

In the case of a first speed change operation, a low side sleeve member 13 having its internal spline meshing with that of the output shaft 11 is moved rightwardly by fork members hereinafter referred to, so that a first synchronizer inner ring 15 is urged against an outer ring 16 thereof via a pin 14. Consequently, the frictional force acting between the conical surfaces of the inner ring 15 and the outer ring 16 causes the both rings to be integral with each other, which results in the synchronization of a first gear 17 and the output shaft 11. Thereafter, the sleeve member 13 and the first gear 17 are spline-connected to each other, and the output shaft 11 is driven from an input gear 18 of the input shaft 10 via a counter input gear 19, a counter shaft 20, a counter low gear 21, the first gear 17 and the low side sleeve member 13.

Next, in the case of a second speed change operation, leftward movement of the sleeve member 13 by the fork member disengages the spline-meshing of the sleeve 13 from the first gear 17, and a second synchronizer inner ring 22 is brought into pressure contact with an outer ring 23 thereof via a pin 14. Consequently, a second gear 24 and the output shaft 11 are brought into synchronization with each other owing to the integration of the inner ring 22 and the outer ring 23 due to frictional force acting between the conical surfaces of the both rings. After the synchronization thus brought about, the sleeve member 13 is spline-connected to the second gear 24, and the output shaft 11 is driven from input gear 18 of the input shaft 10 via counter input gear 19, counter shaft 20, counter second gear 25, second gear 24 and the sleeve member 13.

In the case of a third speed change operation, the low side sleeve member 13 is moved towards right to be returned to the position indicated in the drawing. The rightward movement of a high side sleeve member 26 having its internal spline engaged with that of the output shaft 11 serves to rightwardly push a third synchronizer ring 28 via a key 27 to be brought into pressure contact with a third gear 29. Consequently, the third gear 29 and the third ring 28 become integral with each other owing to the frictional force acting on the conical surfaces of the both members, which causes the synchronization of the both members 28 and 29 to be brought about. Thereafter, the high side sleeve member 26 is spline-connected to the third gear 29, and the output shaft 11 is driven from the input gear 18 of the input shaft 10 via counter input gear 19, counter shaft 20, counter third gear 30, third gear 29 and high side sleeve member 26.

In the case of a top speed change operation, the high side sleeve member 26 is leftwardly moved to disengage the spline-engagement of the third gear 29 from the sleeve member 26, and to leftwardly push a top synchronizer ring 31 to bring it into pressure contact with the input gear 18. Consequently, the frictional force acting on the conical surfaces of the input gear 18 and the top synchronizer ring 31 causes the both to be integral with each other, thereby effectuating the synchronization of the both. Thereafter, the high side sleeve member 26 is spline-connected to the input gear 18, and the output shaft 11 is driven from the input gear 18 of the input shaft 10 via the high speed sleeve member 26.

The foregoing explanation of the construction and operation of the first embodiment according to the present invention is concerned with the forward drive stage only, but in the case of the rear drive stage, the drive is executed by the same manner of operation as the conventional one by the use of a manually operable lever through a conventional reverse rod, not shown.

Figure 3:
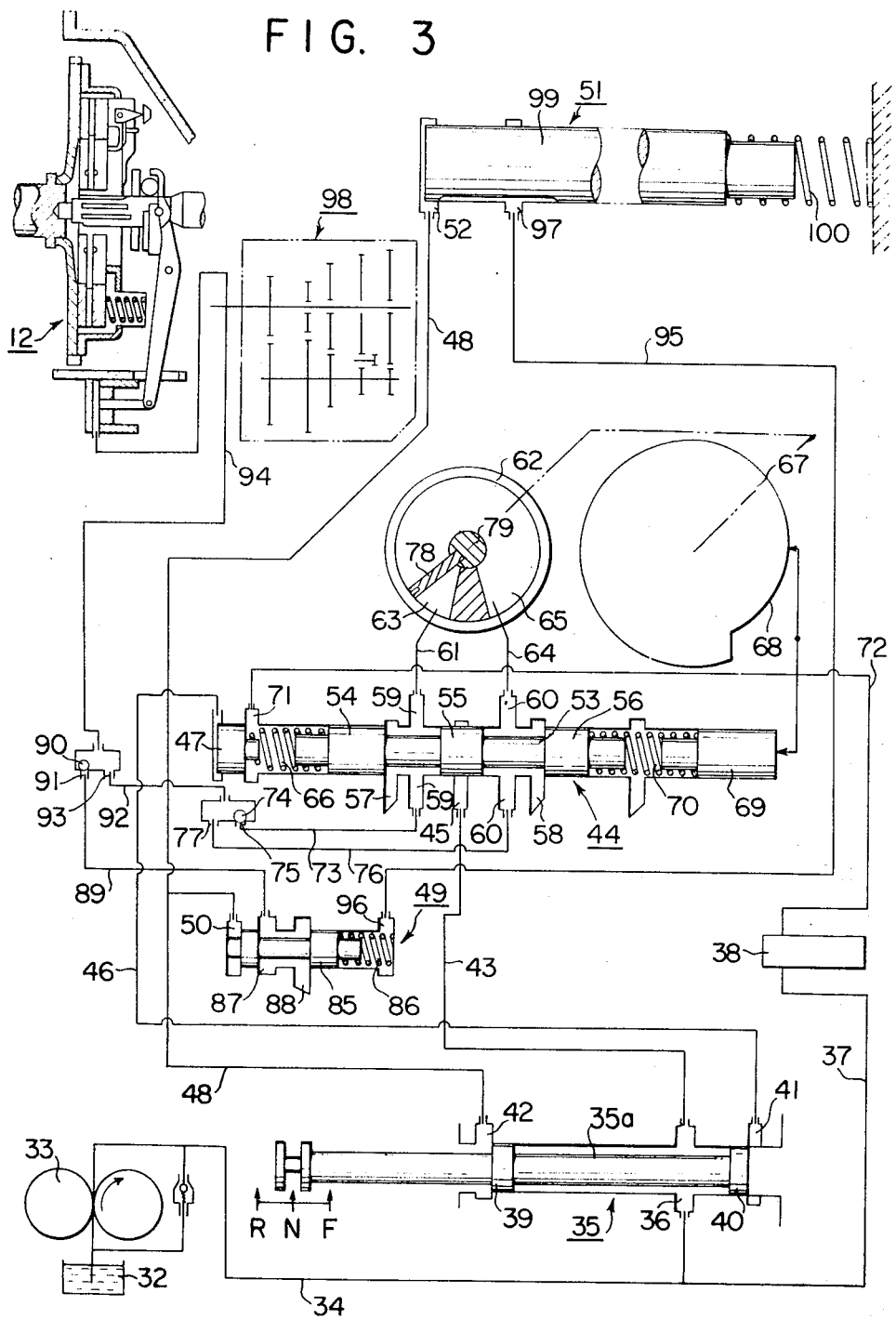
FIG. 3 is a schematic and partially sectioned representation of main constituents of a control circuit embodying the novel teaching of the invention and adapted for cooperation with the speed changer shown in FIG. 1.

Next, the control arrangement for the present speed change mechanism is explained hereinafter. In FIG. 3, the numeral 32 denotes an oil tank, and the fluid contained in the oil tank 32 is arranged to be delivered by a pump 33 to a port 36 of a shift valve assembly 35 through a conduit 34. At the same time, the pumped pressure oil is delivered through a piping 37 to a hydraulic governor unit 38, only schematically being shown by a block, thence through a further piping 72 to a port 71 of a shift valve unit 44. Manual valve unit 35 is provided with a valve slide 35a which is formed with valve lands 39 and 40. Land 39 is adapted for on-off control of a port 42 of the valve unit 35, while land 40 is adapted for on-off control of port 41, port 36 being kept in fluid communication through a piping 43 to a port 45 of shift valve unit 44. Port 41 is adapted for delivery of pressure oil through a piping 46 to a plug 47 of the valve unit 44. Port 42 is kept in fluid communication through a piping 48 to a port 50 of relay valve unit 49, and to a port 52 of a reverse rod unit 51.

Shift valve unit 44 comprises a slidable shift valve 53 formed with lands 54, 55 and 56. Land 54 is adapted for on-off control of a port 57 of the shift valve unit 44; land 55 controls port 45 and land 56 controls port 58, respectively.

Shift valve unit 44 comprises further ports 59 and 60, of which port 59 is connected through a piping 61 to upshift chamber 63 of servo-cylinder 62; port 60 is kept in fluid communication with downshift chamber 65 of the same servo-cylinder.

A spring 66 is mounted under pressure between the left-hand end of shift valve 53 and a plug 47, and a further spring 70 is mounted again under pressure between the right-hand end of shift valve 53 and a plug 69, the latter being kept thus in pressure contact with the working surface 68 of a plate cam 67.

Port 59 of shift valve unit 44 is hydraulically connected through a piping 73 to a port 75 under control of a check ball 74. Port 60 of the unit 44 is hydraulically connected through a port 77 to be controlled by the check ball 74.

Servo-cylinder 62 is provided with a rotatable piston 78 fixedly mounted on a rotatable shaft 79, said plate cam 67 being fixedly mounted on this shaft, although these both have been shown separately in FIG. 3 only for graphical convenience.

Figure 2:
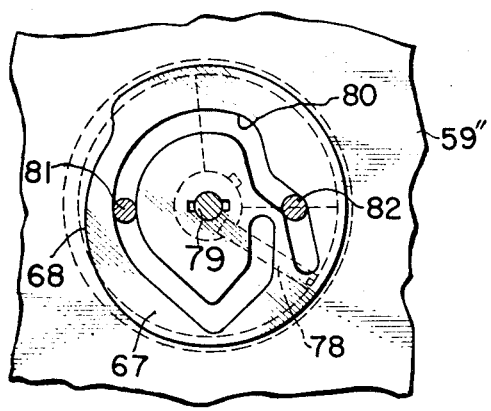
FIG. 2 is a sectional representation substantially taken along a section line A – A' shown in FIG. 1.

Plate cam 67 is formed with a continuous cam groove 80 with which a pair of follower pins 81 and 82 are kept in slidable engagement (see, FIG. 2). To the lower ends of these pins 81, fork members 83 and 84 (FIG. 1) are fixedly attached, which are kept in respective engagement with said high side sleeve 26 and low side sleeve 13, so as to move these sleeves leftwards or rightwards, when actuated.

Relay valve unit 49 is provided with a relay valve member 85, a spring 86 urging the latter to move in the leftward direction, and ports 87 and 88. Port 87 is connected through a piping 89 to port 91 which is adapted for on-off control by check ball. Pressure oil from port 75 or 77 is conveyed through piping 92 to port 93 which is adapted for on-off control by check ball 90. Pressure oil from port 91 or 93 is conveyed through a piping 94 to said friction clutch 12 for on-off control of the same.

A piping 95 connects port 96 of relay valve unit 49 to port 97 of reverse rod unit 51. Numeral 98, FIG. 3, represents a group of gears included in the mechanism shown in FIG. 1. Numeral 99 represents reverse rod per se included in the unit 51 and urged at its left-hand end towards right by an urging spring 100.

The operation of the control mechanism is as follows:

When the drive engine, not shown, is running, oil is sucked by the pump 33 from oil tank 32 and delivered through piping to port 36 of the manual valve unit 35. When its valve member 35a is positioned at the forward range "F", pressure oil supplied to the port 36 is further conveyed through piping 43 to port 45 of the shift valve unit 44. At the same time, pressure oil is conveyed from port 36 through the interior space around the valve member 35a and defined between valve lands 39 and 40, to port 41 of the valve unit 35, thence through piping 46 to the left-hand end of the valve unit 44 so that plug 47 is urged to move rightwards, thus the shift valve member 53 being urged to move in the same direction. In this way, valve land 55 now opens port 45 and port 57 now closes port 59. Pressure oil conveyed to port 45 will further be delivered through port 59 and pipings 73 and 61, respectively. Pressure oil conveyed to the piping 73 will open forcibly the check ball 74 at the port 75, said check ball now closing the neighboring port 77. Pressure oil will be thus further conveyed through piping 92, port 93 and a further piping 94 to the clutch unit, so as to make the friction clutch 12 of conventional design off. At this stage, check ball 90 is kept in its left-hand operating position to close port 91, as shown.

At the same time, pressure oil conveyed to piping 61 is further delivered to the upshift chamber 63, thereby the piston 78 being rotated in clockwise direction in FIG. 3 accompanying the plate cam 67. Therefore, follower pin 82 engaging with the cam groove 80 is shifted in the right-hand direction in FIG. 1, thus the fork member 84 attached fixedly to the pin being moved equally rightwards. Low side sleeve 13 is, therefore, moved rightwards to occupy the first speed stage position.

By the rotation of plate cam 67 in the clockwise direction, plug 69 is shifted leftwards by contact with cam surface 68 and the shift valve member 53 is returned under the influence of spring force at 70 to the position shown in FIG. 3. Therefore, port 45 is closed and port 57 is opened. Pressure oil prevailing in pipings 94 and 61 and, therefore, conveyed through port 59 to port 57 for being discharged. Thus, the friction clutch 12 is brought into engagement and, thus, the vehicle will run with the speed changer positioned at the first speed stage.

At the same time, pressure oil conveyed to the piping 34 will be further delivered through piping 37 to the mechano-hydraulic governor unit 38, thereby a hydraulic pressure in function of the occasional vehicle speed, engine output or the both, as the case may be as conventionally known, being taken out from the governor and conveyed through a piping 72 to the port 71 of the shift valve unit 44. Thus, the shift valve member 53 is urged hydraulically to move rightwards. When the vehicle speed should exceed beyond a predetermined value, the member 53 is moved rightwards, and its land 55 opens the port 45 and its land 54 closes the port 57. Pressure oil conveyed to port 45 is thus delivered to piping 73, thence to port 75. Check ball 74 is opened hydraulically and is shifted to the neighboring port 77 which is thus closed. Oil is, therefore, conveyed through piping 92, port 93 and a further piping 94 to the clutch unit, so as to disengage the friction clutch member 12. At the same time, the oil prevailing at the port 45 will be further conveyed through port 59 and piping 61 to the upshift chamber 63 of servo-cylinder 62, thereby the piston 78 being rotated in clockwise direction, accompanying the shaft 79 and the plate cam 67. The follower pin 82 kept in engagement with cam groove 80 is, therefore, to shift leftwards and the fork member 84 fixedly attached thereto is shifted equally leftwards. In this way, low side sleeve 13 is shifted, so as to bring the speed changer into its second speed stage.

In this case, the plate cam 67 is rotated in clockwise direction as in the first speed stage, thereby the plug 69 being urged to move leftwards by contact with the cam surface 68. Therefore, shift valve member 53 is returned to its position shown in FIG. 3. Now, port 45 is closed and port 57 is opened. Pressure oil prevailing in the pipings 94 and 61 is conveyed through port 59 to 57, for being discharged therefrom. In this way, the clutch member 12 is brought into its engaged position and the vehicle will run with the speed changer conditioned to the second speed stage.

With increase of the vehicle speed or the engine output under these operational conditions, the thus modified hydraulic pressure delivered from the governor unit will act upon the shift valve member 53 as described in the foregoing, so as to disengage the clutch member 12 and to rotate the plate cam 67 further in the clockwise direction. The follower pin 82 kept in engagement with cam groove 80 will be returned to its neutral position, while the another follower pin 81 will be shifted rightwards for bringing the high side sleeve 26 into its third speed stage position. Thereafter, the clutch member 12 is brought into engagement in the manner referred to hereinbefore, and the vehicle will run with the speed changer conditioned to its third speed stage.

With further increase of the vehicle speed or the engine output, the speed changer will similarly brought into its fourth speed stage.

On the other hand, when the oil pressure prevailing in the piping 72 is reduced by virtue of the vehicle speed or engine output, the shift valve member 53 is shifted in the reverse or left-hand direction, its land 55 now opening the port 45 and its land 56 closing the port 58. In this way, pressure oil conveyed to port 45 will be conveyed through port 60 and piping 76 to port 77. Check ball 74 will now close port 75, and oil pressure will be conveyed through piping 92 to piping 94, thus the friction clutch 12 being brought into its disengaged position.

On the other hand, pressure oil prevailing at the port 60 is conveyed through the piping 64 to the downshift chamber 65, thereby the piston 78 being rotated in counter clockwise direction, accompanying its shaft 79 and the plate cam 67. Motion is thus transmitted from the cam through cam groove 80 and follower pins 81 and 82 to the fork members 83 and 84 which are now shifted in the reverse direction to that described in the foregoing. In this way, the foregoing speed changing stage will be released and switched to a new speed change stage which corresponds to the now prevailing occasional vehicle speed or the engine output, as the case may be or in combination of the both.

At this period, the plug 69 is shifted rightwards by virtue of contact with a cam-rise reducing range formed on the cam surface 68 of plate cam 67. Shift valve member 53 is therefore returned to the position shown in FIG. 3. The port 45 is now closed and the port 58 is now opened. Pressure oil prevailing in the pipings 94 and 64 will be now conveyed through ports 60 and 58 for being discharged. Friction clutch 12 is therefore brought into its engaged position.

When it is assumed that manual valve unit 35 is manually adjusted to its neutral position shown at "N" in FIG. 3, pressure oil conveyed to port 36 will be fed further to port 45. By virtue of the oil pressure prevailing at port 41 being substantially nil at this stage, the shift valve member 53 of the valve unit 44 is kept in its position shown in FIG. 3, because the opposing spring forces at 66 and 70 are selected to balance out with each other. Therefore, no alteration in the speed change operation can be brought about.

It is now assumed that the manual valve unit 35 is manipulated to the rear drive stage or range "R" shown schematically in FIG. 3, pressure oil conveyed to port 36 will further fed through port 42 and piping 48 to port 50 of the relay valve unit 49, thus the valve member 85 being hydraulically shifted rightwards against the action of spring 86. Pressure oil hitherto conveyed to port 50 is further conveyed through port 87 and piping 89 to port 91, opening hydraulically the check ball 90 which is then brought into pressure and closing contact with port 93. Pressure oil is thus conveyed to piping 94, so as to bring the friction clutch 12 into its disengaged position.

At the same time, pressure oil will act upon the reverse rod 99, so as to shift the latter rightwards against the action of spring 100. Upon establishment of the engagement to the rear drive mode, port 97 is opened and pressure oil conveyed from port 52 to port 97 will be further conveyed to port 96 of the relay valve unit 49. Pressure oil will thus act upon the relay valve member 85 which is then returned to the position shown in FIG. 3. Thus, pressure oil prevailing in the piping 94 will conveyed from port 87 to port 88 so as to be discharged therefrom. Therefore, the friction clutch 12 is brought into its engaged position.

When the manual valve is shifted from rear drive range "R" to any one of the forward drive ranges, oil pressure prevailing in the piping 48 will become nil, thus the reverse rod 99 being returned under the spring pressure at 100 to the position shown in FIG. 3.

As will be easily understood from the foregoing that the first embodiment shown and described so far is so designed and arranged that the clutch unit provided between the input shaft and the gear group is supplied with control fluid pressure from between the servo device adapted for shifting the operating lever of the speed changer and the valve unit adapted for supplying power to the servo device from the power source. Thus, the servo-pressure for the control of the speed change lever is utilized for the disengagement of the clutch, resulting in substantial obviation of otherwise possible time lag between the servo-action for the speed change lever and that for the control of the lever and assuring a positive and reliable, practical control operation of the clutch. With the speed changer fitted with the synchronizer, the synchronizing period must be modified depending upon the occasional vehicle speed and the occasionally selected speed changing stage. On the other hand, power must be transmitted from the power source to the vehicle wheel as soon as possible upon selection of a specific speed change stage. However, in the case of the control device for the speed changer according to this invention, the servo-pressure for the control of the speed change lever is utilized for the control of the clutch, the modified synchronization providing substantially no effect upon the desired and selected operation of the speed changer.

Next, the second embodiment of the invention will be described by reference to FIGS. 4 – 8 in combination with FIG. 1.

The structure and operation of the speed changer shown in FIG. 1 are same as before and thus, will be omitted for avoiding a duplicated description.

Figure 7:
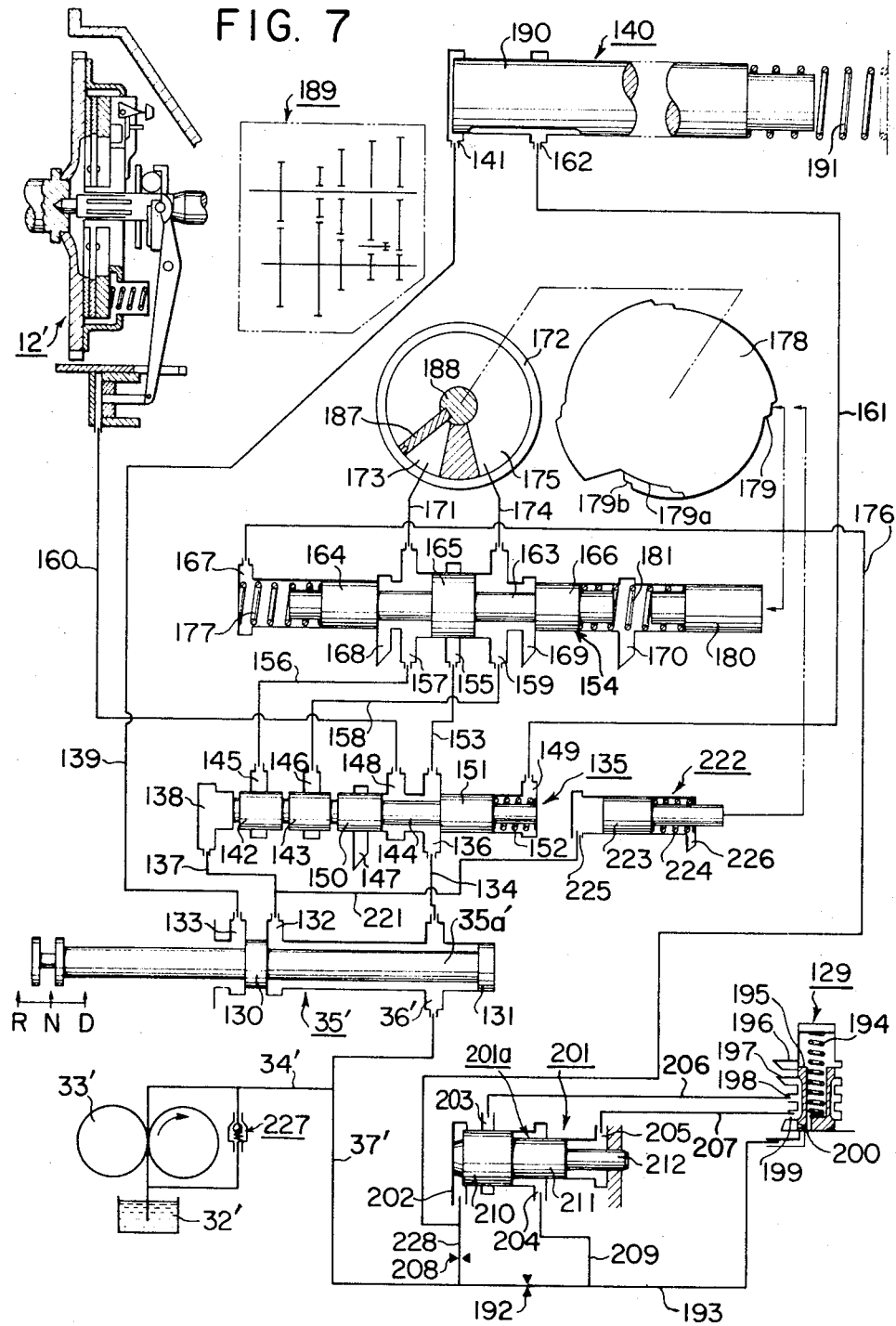
FIG. 7 is a similar view to FIG. 3, illustrative, however, of a second embodiment.

Now referring to FIG. 7, illustrative of a hydraulic control mechanism similar to that shown in FIG. 3, numeral 32' denotes as oil tank, the liquid, preferably oil, contained therein is sucked by a pump 33' and delivered through a piping 34' to a port 36' of a manual valve 35'. Pressure oil thus prevailing in the piping 34' is conveyed through a piping 37' to a mechano-hydraulic governor unit 129 which is mechanically connected with the vehicle drive engine, although not shown. Slide valve member 35a' contained in the unit 35' is formed with valve lands 130 and 131, while the unit is formed with several ports 36', 132 and 133. As seen, land 130 is adapted for performing on-off control of the ports 132 and 133. Port 36' is connected through a piping 134 to a port 136 of a relay valve unit 135. Port 132 is connected through a piping 137 to a port 138 of the unit 135, and through a piping 221 to a port 225 of neutral control unit 222. Port 133 is connected through a circuit 139 to a port 141 of reverse rod unit 140. Relay valve unit 135 is provided with plugs 142 and 143 and a relay valve member 144, and further with ports 136, 138, 145, 146, 147, 148 and 149. Port 145 is adapted for on-off control by a plug 142; port 146 by a plug 143; port 147 by the land 150 of relay valve 144; and port 136 by the land 151.

A spring 152 provided at the right-hand end of relay valve 144 is arranged to urge the relay valve 144 in the left-hand direction. Port 136 of relay valve 135 is hydraulically connected through a piping 153 to a port 155 of shift valve unit 154; port 145 is connected through a piping 156 to a port 157. Port 145 is connected through a piping 158 to a port 159. Pressure oil is adapted for being delivered from port 148 through a piping 160, so as to control aa friction clutch 12'. Port 149 is connected through a piping 161 to a port 162 of reverse rod unit 140.

Shift valve unit 154 is provided with a shift valve member 163 which is formed with lands 164, 166 having smaller diameters, and further with a land having a larger diameter. Shift valve unit 154 is formed with ports 155, 157, 159, 167, 168, 169 and 170. Port 168 is adapted for being on-off controlled by valve land 164; port 155 by the land 165; port 169 by the valve land 166. Port 157 is connected through a piping 171 to an upshift chamber 173 of a servo-cylinder 172; port 159 is connected through a piping 174 to a downshift chamber 175 of a servo-cylinder 172; port 167 is connected through a piping 176 to a pressure regulator valve unit to be described.

Figure 4:
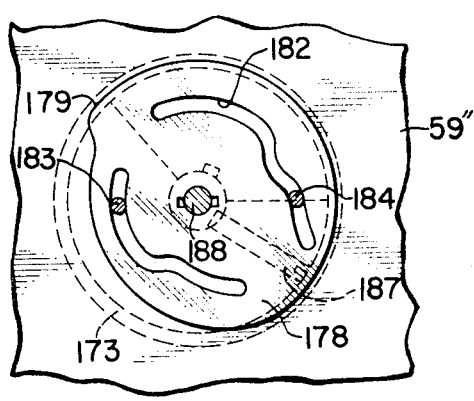
FIG. 4 is a similar view to FIG. 2, showing a part of a second embodiment of the control device.

A spring 177 is provided at the left-hand end of the shift valve member 163 which is thus urged to move rightwards. A spring 181 is inserted between the right-hand end of shift valve 163, and a plug 180 kept in contact with the cam surface 179 of plate cam 178. Plate cam 178 is formed with a cam groove 182 with which two separated follower pins 183 and 184 are kept in engagement as before (FIG. 4). At the bottom ends of these pins 183 and 184, fork members 185 and 186 are attached fixedly, respectively, these fork members being kept in engagement with high side sleeve 26' and low side sleeve 13', respectively, and adapted for shifting these sleeves leftwards and rightwards, as the case may be, when seen in FIG. 7.

Servo-cylinder 172 is provided with a piston 187 which is fixedly mounted on a shaft 188, a piston 187 being fixedly attached to this shaft in the similar way as before.

Numeral 189 represents a group of change gears, as before and arranged in the similar way shown in FIG. 1. Numeral 190 represents a reverse rod; numeral 191 a spring.

Neutral control valve unit 222 is provided with a control valve member 223, a spring 224 being provided at the end of the valve member 223 so as to urge it to move leftwards.

Governor unit 129 is adapted for being fed with pressure oil from below through a piping 193 leading to the piping 37'. Weight valve member 195 of the governor unit is urged downwards by a spring 194. The governor unit is further provided with ports 196, 197, 198 and 199 and a vent opening 200.

Pressure adjusting valve unit 201 adapted for modifying the oil pressure delivered from the governor unit 129 is formed with ports 202, 203, 204 and 205. Port 202 is connected with a piping 228 connected in turn with the piping 37'. Port 203 is connected through a piping 206 to port 198; and port 205 is connected through piping 207 to port 199. Port 204 is connected with a piping 209 which is branched off from the piping 193. The valve member 201a of pressure adjuster 201 is formed with lands 210 – 212 having different diameters. Orifice valves 208 and 192 are provided in the pipings 228 and 193, respectively.

The operation of the control mechanism according to the second embodiment so far shown and described is as follows:

The fluid or oil contained in the oil tank 32' is sucked by a pump 33' and delivered to the port 36' of manual valve unit 35'.

With the manual valve unit 35' adjusted at the drive range "D," shift lever has been naturally manipulated to the position "D." By the shift movement of the lever, low side sleeve 13' which is similar to that shown at 13 in FIG. 1, the attachment of a single prime in the specification being only for the identification purpose and this nomenclature being applied to all the primed reference numerals, is shifted rightwards in FIG. 1 so as to occupy the first speed stage position. At the same time, pressure oil delivered to said port 36' is conveyed through piping 134, port 136 and piping 153 to the port 155 of the shift valve unit 154. Pressure oil prevailing in the piping 34' is conveyed through pipings 37' and 193 to the governor unit 129. This pressure oil will be discharged through vent opening 200 and port 196 and become nil, when the propeller shaft, not shown, is stationary, or the vehicle speed is very slow so that the weight valve 195 is positioned as shown.

At this stage, the pressure oil conveyed from piping 37' through piping 208 to the port 202 of valve unit 201 will urge the valve member 201 rightwards, since no oil pressure is applied on the differential area between the valve parts 210 and 211. Pressure oil conveyed through ports 202 and 203 is conveyed through piping 206 to the port 198 of the governor unit 129 and then discharged through port 197. Thus, no oil pressure prevails in the piping 176 branched off from the piping 228. Therefore, the vehicle will run at the first speed stage.

With increase of vehicle speed, weight valve 195 is shifted upwards in FIG. 7 under the influence of the increased centrifugal force, thus ports 199 and 196 being closed. By virtue of failure of the discharge of oil pressure delivered through the piping 193 to governor unit 129, pressure will be conveyed from the piping 37' through pipings 193 and 209 to the port 204 so that the oil pressure will act upon the cross-sectional difference between valve parts 210 and 211.

Pressure oil conveyed through pipings 37' and 228 will further conveyed to the circuit 176 upon being adjusted to a proper valve corresponding to the aforementioned cross-sectional difference. This adjusted oil pressure is conveyed through piping 176 to the port 167 so that the shift valve 163 is shifted rightwards. Since, until this period the land 165 has opened the port 155 and the land 164 has closed the port 168, the pressure oil prevailing at the port 155 will be conveyed to the port 157, this oil pressure then acting upon the cross-sectional differential between the lands 164 and 165 and the valve member 163 being shifted further rightwards.

Pressure oil conveyed to port 157 will be further conveyed to the port 145 of the relay valve unit 135, thereby urging the plug 142 leftwards and the plug 143 and relay valve 144 rightwards against the action of spring 152. Pressure oil conveyed to the port 136 will e further conveyed to port 148 and piping 160, so as to disengage the clutch unit 12'. At the same time, pressure oil is conveyed from port 157 through piping 171 to the upshift chamber 173 of servo-cylinder 172 for moving the rotatable piston 187 in clockwise direction, accompanying the shaft 188 in the similar way as before. Therefore, the plate cam 178 is rotated similarly in the clockwise direction. Follower pin 184 engaging with the cam groove 182 is therefore shifted leftwards and the fork member 84' being moved similarly. Low side sleeve 13' is therefore actuated to adjust the speed changer to the second speed stage.

By the clockwise rotation of plate cam 178, plug 180 is shifted leftwards by contact with the cam surface 179.

Figure 5:
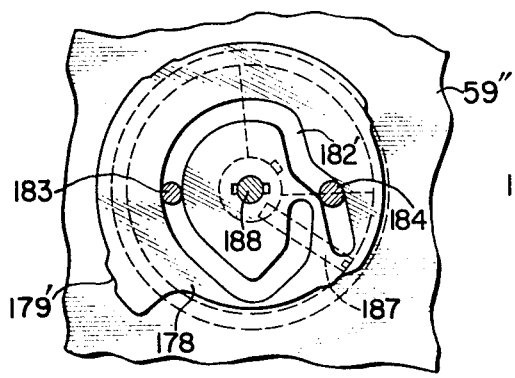
FIGS. 5 and 6 are similar views to FIG. 4, illustrative of slight modifications therefrom.
Figure 6:
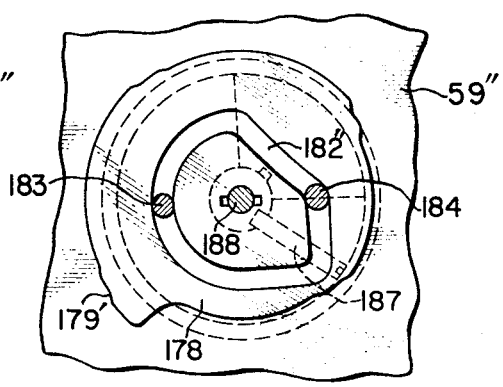
Figure 8:
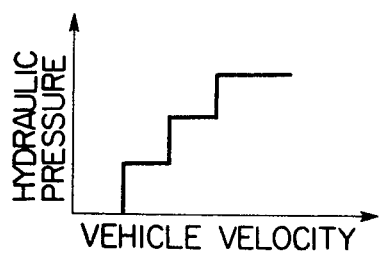
FIG. 8 is a chart of the hydraulic brake pressure plotted against the vehicle velocity, for the illustration of the operational steps of the speed changer according to this invention.

At the positions shown in FIGS. 5 and 6, the follower pin 184 is shown ready for abrupt shifting in its position at the respectively selected speed change stage. In this position, the shift valve member 163 will be returned by the pressure exerted by spring. Thus, the port 155 is closed, while the port 168 is opened. The pressure oil in the piping 171 is discharged through the now opened port 168 and the hydraulic pressure acting hitherto upon the cross-sectional differential between the valve lands 166 and 165 will become nil. The piston 187 will remain at the present position. Since pressure oil fed to the port 145 is discharged through the port 168, plug 143 and relay valve 144 will be returned to its left-hand position by the pressure exerted by spring 152, thereby the port 136 being closed and the port 147 being opened. Pressure oil prevailing in the piping 160 is discharged through the port 147 and the clutch unit 12' is brought into engagement.

With further increase of the vehicle speed, the weight valve 195 will open the port 199 and the pressure oil conveyed through pipings 37' and 193 to the governor unit 129 will be further conveyed through port 199 and piping 207 to the port 205 of the pressure adjuster 201. Therefore, the unit 201 is applied with a modified oil pressure corresponding to the cross-sectional differential between valve parts 211 and 212, while the oil pressure acting upon the pressure adjusting valve 201 through piping 228 and port 202 will be adjusted in a stepped manner, as illustrated schematically in FIG. 8 and in the aforementioned correspondence to the sectional area differential. This adjustingly modified oil pressure will act upon the shift valve unit 154 from the piping 176, thus the similar operation as was referred to hereinbefore will be executed. More specifically, cam 178 is rotated clockwise and the high side sleeve 26' is brought into its new position corresponding to the third speed stage of the speed changer.

At this stage, low side sleeve 13' is returned to its neutral position under the influence of the rotating cam 178.

With still further increase of the vehicle speed, the weight valve member 195 opens the port 198, the governor pressure prevailing at the port 202 becoming equal to the line pressure. In the similar way as referred to hereinbefore, the high side sleeve 26' is shifted leftwards to the fourth speed stage of the speed changer.

On the contrary, when the vehicle speed lowers, the weight valve 195 closes port 198 or 199 and pressure oil conveyed to port 203 or 205 will be discharged through piping 206 or 207. Therefore, the oil pressure conveyed from piping 209 to port 204 will act upon the pressure regulator valve, more specifically upon the cross-sectional differential between valve parts 210 and 211. The oil pressure conveyed hitherto to port 202 is adjusted to a lower one than before, thus reducing the hydraulic urging pressure fed through port 167 acting upon shift valve 163 so as to shift it rightwards. Therefore, the shift valve 163 is shifted leftwards under the action of spring 181. The pressure conveyed to the port 155 will be further conveyed to port 159, since the land 165 opens the port 155 and the land 166 closes the port 169. The said pressure will act upon the cross-sectional differential between the lands 165 and 166, thereby the valve member being shifted leftwards.

The oil pressure conveyed to port 159 will be further conveyed through piping 158 to port 145, so as to urge the plugs 142 and 143 leftwards and to shift the relay valve 144 rightwards under the action of spring 152. Pressure oil will be conveyed from port 136 through port 148 and piping 160, so as to disengage the clutch 12'. At the same time, pressure is conveyed from port 159 through piping 174 to the downshift chamber 175 of servo-cylinder 172, so as to rotate the piston 187 in counter clockwise direction. Shaft 188 and plate cam 178 are rotated in counter clockwise direction.

Follower pins 183 and 184 are shifted leftwards and rightwards, respectively, and the fork members 185 and 186 are shifted correspondingly. Thus, high side sleeve 117 and low side sleeve 13' are moved correspondingly, so as to adjust the speed changer to a lower speed stage.

Rotation of plate cam 178, the plug 180 is shifted rightwards by contact with cam surface 179 and the spring pressure at 181 is reduced correspondingly. By the action of spring 177, shift valve 163 will be moved rightwards.

In the position shown in FIG. 5 or 6, follower pin 184 is about to make an abrupt shift for returning the shift valve member 163 at a certain specifically selected speed changing stage. In this way, port 155 is closed, while port 169 is opened. Thus, the pressure oil 169 prevailing in the piping 171 is discharged through the port 169 and the oil pressure acting upon the cross-sectional differential between valve lands 165 and 166 will become nil. Thus, the piston 187 is kept in its present position without shifting. At the same time, oil pressure prevailing at the port 146 is discharged through port 169 and the relay valve 144 is returned leftwards under the action of spring 152, thus port 136 being closed and port 147 being opened. Oil pressure prevailing in the circuit 160 is discharged through the now opened port 147, so as to bring the friction clutch 12' into engagement.

With further reduction of the vehicle speed, the speed changer will be down-shifted in the similar manner.

When the manual valve unit 35' is manipulated to its neutral position at "N," the valve land will occupy such position as to allow pressure oil from port 36' to port 132, thence through piping 137 to port 136. Oil pressure will act upon plugs 142 and 143 and relay valve member 144 so as to shift against the action of spring 152. Pressure conveyed to port 136 will be further conveyed through port 148 and piping 160 for disengaging the clutch 12'. At the same time, pressure oil conveyed from piping 221 to port 225 will act upon the neutral control valve 223 so as to shift the latter against the action of spring 224. In this way, the engaging point of the plug 180 with the cam surface 179 of plate cam 178 will shift from 179a to 179b. In this way, the speed changer will be kept at its neutral position when the oil pressure prevailing in the piping 176, representing a kind of the vehicle speed signal, nil. On the contrary, when this vehicle speed-responsive signal pressure is increasing in a stepped manner as shown schematically in FIG. 8, a necessary speed change stage has been established. In this case, the friction clutch 12' is brought into its disengaged state.

When the manual valve unit 35' is manipulated to its reverse drive range "R," valve land 130 is so positioned that pressure oil is conveyed from port 36' to port 133, thence through piping 139 to port 241, thereby the reverse rod 190 being shifted against the action of spring 191. In this way, the speed changer is brought into its reverse drive range. Upon the shift of the rod 190 to its reverse drive range, pressure oil will be conveyed from port 141 to 162, thence through piping 161 to port 149, so as to balance out with the oil pressure conveyed through the port 138. Spring 152 will thus act upon plugs 142 and 143 and relay valve 150 so as to shift them leftwards. Thus, port 136 is closed and port 147 is opened. Oil pressure prevailing in the piping 160 will be discharged through the now opened port 148, for bringing the clutch 12' into engagement. Therefore, the vehicle will be driven in the reverse drive direction.

It will thus be seen in the case of the second embodiment of the invention, the pressure oil fed to the servo-device adapted for operating a cam means provided for performing the selective operation of speed gear change through selected gear engagement, will act at the same time upon the shift valve member so as to generate an oil pressure responsive to a differential area thereof. By the oil pressure fed to the servo-device from a supply source, the shift valve member is urged to move such direction as to accelerate the oil pressure supply. Therefore, both the upshift and down-shift operations may be controlled only through this shift valve device and an accurate control operation can be assured. Additionary and sptionary, a hysteresis effect may be provided on the operation of the shift valve device which means a substantial advantage in the art.

Figure 9:
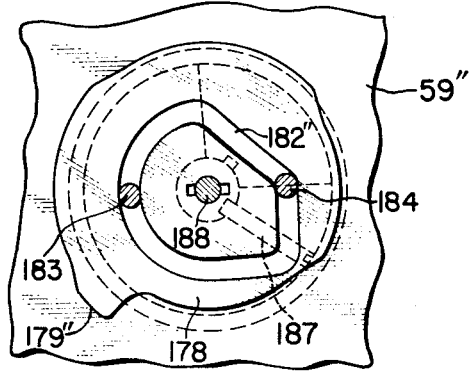
FIG. 9 is a similar view to FIG. 2, illustrative of a part of a third embodiment.

The cam arrangement shown in FIG. 9 is substantially similar to that shown in FIG. 6. In FIGS. 5, 6 and 9, the members denoted by respective same reference numerals, each attached with one or two primes is similar in function with each other or with that having no prime. The member 59" is similar in its function to that shown at 59 in the foregoing. The operational mode shown in FIG. 8 can naturally be applied to the first embodiment. In these cases, the number of operational steps is naturally optional.

What is claimed is:

1. In a speed change device for a powered wheeled vehicle, said speed changer having an input shaft, and output shaft, a plurality of selectively engageable gear trains connected between said shafts, a means for selecting and obtaining a desired speed change stage between said shafts by selection and engagement of any one of said gear trains, comprising in combination:

a. a clutching unit operatively connected between said input shaft and a vehicle power source;
   b. a cam means operatively connected to a plurality of gear train selection means for selectively establishing a speed change condition between said input and output shafts;

c. a servo means operatively connected to said cam means for actuating said cam means;
e. a hydraulic pressure source;
f. a vehicle operating condition responsive means for generating a signal in response to a predetermined condition of said vehicle;
g. said condition responsive means being hydraulically communicated with said hydraulic pressure source;
h. a valve means operatively connected with said cam means and controlled thereby for movement in a first direction;
i. said valve means communicating with the output of said condition responsive means for movement in a second direction opposite said first direction in response to said signal from said responsive means;
j. a hydraulically actuated clutch actuating means for selectively engaging and disengaging said clutch in response to hydraulic pressure applied thereto;
k. fluid passage means communicating said hydraulic pressure source with said servo means and said hydraulic clutch through said valve means, said valve means being moved in said first direction in response to movement of said cam means to block communication of said hydraulic pressure source with said servo means and said hydraulic clutch actuator and being moved in said second direction in response to an increase in the pressure signal from said condition responsive means to communicate said hydraulic pressure source with said servo means for changing the selection of said gear trains and simultaneously communicating said hydraulic pressure source with said hydraulic clutch actuator to disengage said clutch during the selection of one of said gear trains.

2. Gear changer selection control means as set forth in claim 1, further comprising: a manually operable valve having a forward drive position and a reverse drive position, said manually operable valve having an inlet port communicated with said hydraulic pressure source, and a first, second and a third outlet port, said first and second outlet ports of said manually operable valve being communicated with said inlet port when said valve is in the reverse drive position, said first outlet port being communicated with a reverse drive actuating servo means, said second outlet port of said manually operable valve being communicated with said valve means for selectively applying hydraulic pressure to said servo means to select one of said gear trains, the position of said valve means being responsive to the position of said cam means and the output signal of said vehicle condition responsive means, said third outlet port of said manually operable valve being communicated with said valve means to assist the output signal of said vehicle condition responsive means in moving said valve means in said second position when said manually operable valve is in said forward drive position, second passage means communicating said first outlet port of said manually operable valve with said hydraulically actuated clutch actuator, and a second valve means connected in said second passage means, and a third passage means communicating said first outlet port with said reverse drive gear train servo, said hydraulically actuated clutch actuator being communicated with said first outlet port of said manually operable valve through said second valve means when said manually operable valve is initially placed in the reverse drive position, and said second passage means is blocked from communication with said first outlet port when said reverse drive gear is established by said reverse drive actuating servo means.

3. A gear changer selection control means as set forth in claim 1, wherein said cam means comprises a plate cam, said plate cam being mechanically engaged with engagable members of said speed changer for mechanically selecting any one of said gear trains in response to the movement of said plate cam.

4. A gear changer selection control means as set forth in claim 1, wherein said vehicle conditioned responsive means comprises a governor valve assembly for generating an output signal is response to the speed of said vehicle.

5. A gear changer selection control means as set forth in claim 1, wherein said vehicle conditoned responsive means comprises an engine torque responsive means for generating an output signal in response to the torque demand on the vehicle power source.

6. In a speed changer for a powered and wheeled vehicle, said speed changer including an input shaft and output shaft a plurality of selectively engageable gear trains connected between said shafts, a control means for selectively obtaining a desired speed change stage between said shafts by selection of any one of said gear trains, comprising in combination:
a. a hydraulic pressure source,
b. a hydraulically actuated clutch means connected between said input shaft and the vehicle power source,
c. a cam means operatively connected with a plurality of engageable members connected to said gear trains for actuation thereof to establish a selected speed change condition between said input and output shafts,
d. a hydraulically actuated servo means operatively connected to said cam means for actuation thereof, said servo means being hydraulically connected to said hydraulic pressure source,
e. a vehicle condition responsive means hydraulically connected to said pressure source for generating a signal in response to a predetermined vehicle condition,
f. a first valve means operative connected with said cam means and hydraulically connected between said hydraulic pressure supply and said servo means, said first valve means being movable in a first direction by said cam means to interrupt hydraulic communication of said hydraulic pressure source with said servo means, said first valve means being communicated with the output signal of said vehicle condition responsive means and movable in a second direction opposite said first direction in response to said output signal to communicate said hydraulic pressure source with said servo means,
g. a manually operable valve connected between said hydraulic pressure source and said first valve means for controlling the distribution of hydraulic pressure, said manually operable valve having a reverse gear position, a neutral position and a forward gear ratio position, and h. a second valve means hydraulically connected between said first valve means and said manually operable valve means, a first passage means communicating said second valve means and said hydraulically actuated clutch assembly, a second passage means connected between said second valve means and said first valve means, said second valve means opening said first passage means for establishing fluid communication between said pressure source and said clutch unit establishing fluid communication between said pressure source and said first valve means when said manually operable valve is in its neutral position.

7. A gear change selection control means as set forth in claim 6, further comprising a second servo means for engaging a reverse drive gear train, said second servo means being hydraulically communicated with said second valve means, said second valve means being movable to a first position to block communication with said first passage means and open communication with said second passage means when said manually operable valve is in its forward drive position for communicating said second passage means with said servo means, said second servo means being actuated when said manually operable valve is in its reverse drive position to open communication with said first and second passage means.

8. A gear changer selection control means as set forth in claim 6, further comprising a third valve means hydraulically connected with said manually operable valve and operably connected with said cam means, said third valve means engaging said cam means when said manually operable valve is placed in its neutral position to displace said cam means in response to a signal from said condition responsive means.

* * * * *